United States Patent [19]

Rosenfeld et al.

[11] Patent Number: 4,817,137

[45] Date of Patent: Mar. 28, 1989

[54] APPARATUS FOR REMOTELY DETERMINING HOOK STATUS CONDITIONS

[76] Inventors: Yechiel Rosenfeld, 300 Cinnabar La., Yardley, Pa. 19067; Larry Kahhan, 519 Fairman La., Langhorne, Pa. 19047; Jaulin Ding, 922 N. 64th St., Philadelphia, Pa. 19151

[21] Appl. No.: 126,877

[22] Filed: Nov. 30, 1987

[51] Int. Cl.⁴ .............................................. H04M 3/26
[52] U.S. Cl. ...................... 379/377; 379/381
[58] Field of Search .................. 379/6, 37, 39, 377, 379/350, 46, 381

[56] References Cited

U.S. PATENT DOCUMENTS 4,647,723  3/1987  Voorhies ............................. 379/381
4,686,700  8/1987  Perry .................................. 379/377

*Primary Examiner*—Stafford D. Schreyer
*Attorney, Agent, or Firm*—Weiser & Stapler

[57] ABSTRACT

An apparatus for effectively monitoring the hook status of a remotely stationed telephone, and a sub-audible tone associated with a corresponding alarm reporting device, monitors variations in impedance in the subscriber loop, preferably from the central facility which is monitoring the remote location. To this end, a disturbance (voltaage signal) is introduced onto the subscriber loop by an appropriate source. Steps are then taken to measure potential variations in this voltage signal, and to determine the hook status of the subscriber loop based upon these variations in potential. To make sure that the ancillary equipment which is being connected to the telephone network will not adversely affect basic telephone services, care is taken to make sure that the signal which is introduced onto the subscriber loop will neither create audible noises on the telephone line, nor interfere with the operation of the switching equipment of the telephone company. A lowfrequency AC sine wave is used for this purpose, preferably the low tone which is produced by the remotely stationed alarm reporting device. The selected signal is inductively coupled to the monitoring apparatus to prevent unacceptable interference with the equipment of the telephone company, and to promote line balance and isolation.

44 Claims, 3 Drawing Sheets

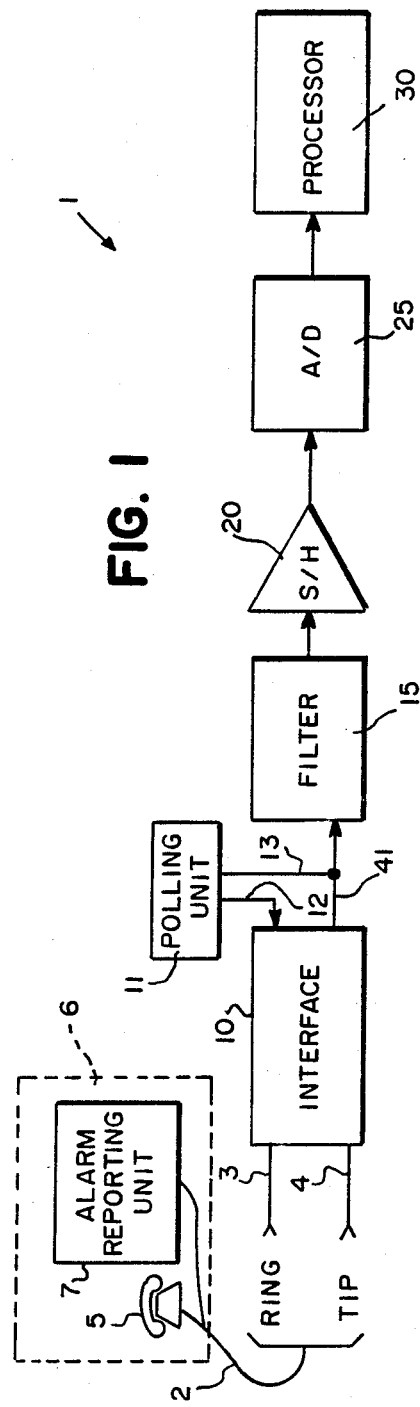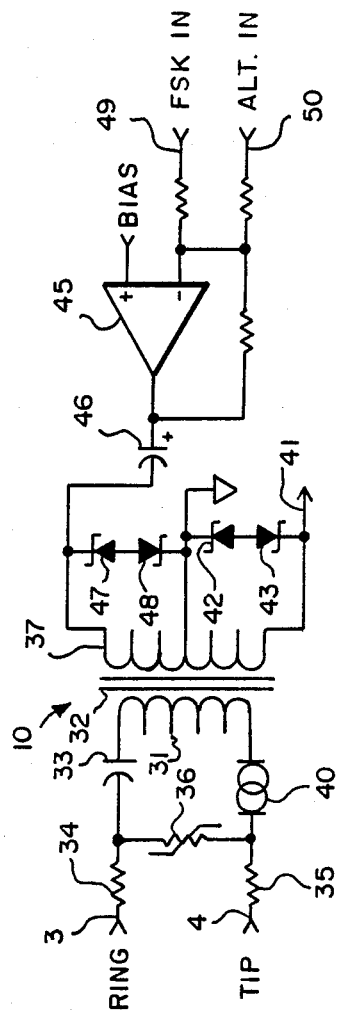

APPARATUS FOR REMOTELY DETERMINING HOOK STATUS CONDITIONS

BACKGROUND OF THE INVENTION

The present invention relates generally to systems for monitoring conditions at a remote location, particularly status conditions associated with an alarm reporting device stationed at the remote location.

U.S. Pat. Nos. 4,442,320 and 4,528,423 describe a device which can be stationed at a remote location to monitor conditions at the remote location and to provide status reports to a central monitoring facility. The central monitoring facility is provided with a polling unit, such as the unit described in U.S. Pat. No. 4,527,235, to periodically monitor the remotely stationed device and to detect potential deviations which might indicate a need for attention (e.g., an alarm condition). Such devices combine to keep the central monitoring facility advised of the status of the remote location, and to immediately advise the central facility of potential alarm conditions.

To this end, the remotely stationed device operates to receive signals from one or more sensors associated with the location which is being monitored, and to ascertain the condition of these sensors. The polling unit operates to periodically interrogate the remotely stationed device to monitor its status, and accordingly, the status of its associated sensors. Since this exchange is advantageously accomplished by telephone, it is preferable for these periodic interrogations to proceed only when the telephone line which is used to establish communications between the polling unit and the remotely stationed device is not in use (i.e., on-hook) since the signals which are used in performing these periodic interrogations tend to produce unacceptable audible interference with a telephone which is in use. Consequently, during periods when the telephone is in use (i.e., off-hook), such periodic interrogations are discontinued. However, since this would effectively prevent an alarm condition from being reported to the central monitoring facility when the telephone line is otherwise in use, the remotely stationed device is additionally caused to emit a sub-audible tone which continues when conditions are normal, but which is discontinued upon the detection of an alarm condition. This sub-audible tone is used to monitor the status of the remotely stationed device when the telephone is off-hook, instead of performing periodic interrogations. If it is determined that the sub-audible tone has been discontinued, it is presumed that an alarm condition is present, and an immediate interrogation of the remotely stationed device is caused to proceed even though the telephone is off-hook, and in use. This allows normally unaffected usage of the telephone, while assuring that alarm conditions are presently monitored and immediately reported.

The proper operation of such a system is therefore clearly dependent upon an effective determination of the hook status (either on-hook or off-hook) of the communicating telephone line (the subscriber loop), in addition to whether or not the sub-audible tone is present. In connection with conventional telephone systems, the hook status of the subscriber loop was readily determined by monitoring variations in the DC voltage across the subscriber loop. This voltage was known to decrease when the telephone was drawn off-hook, presenting a differential in voltage which could be monitored to make an effective determination of hook status. However, difficulties were encountered in effectively determining the hook status of certain subscriber loops by simply monitoring changes in DC voltage across the loop. For example, due to their impedance, it was found that certain extended subscriber loops tended to exhibit a significantly decreased variation in voltage between on-hook and off-hook conditions. What is more, while this variation would usually take the form of a decrease in potential, increases in potential were also found to occur. The range extension circuitry which is used to accommodate these extended loops was found to even further limit the predictability of these variations in DC voltage. In some cases, this difference in voltage was found to be so small that an effective determination of hook status could not be made by monitoring such DC voltages. Similar difficulties were experienced in connection with some of the more comprehensive subscriber loop configurations which are presently being implemented (e.g., concentrated, multiplexed, etc.).

In such cases, it was found that an effective determination of hook status could not be made simply by monitoring differences in DC voltage across the subscriber loop, in the traditional fashion. Ordinarily, this difficulty could be overcome by monitoring currents within the subscriber loop, since this would be unaffected by the above-described variations in subscriber loop configuration. However, such current measurements are effectively prevented because telephone companies are highly reluctant to allow any components to be placed in series with their subscriber loops, since this could have an adverse effect on the performance of existing telephone equipment, and since available current probes (e.g., hall-effect sensors) which could substitute for this are quite expensive and not entirely reliable in actual application.

It therefore remained to develop a means for effectively determining hook status, while also effectively monitoring the sub-audible tone of an alarm reporting device, without having to rely upon unpredictable variations in voltage or unworkable variations in current.

SUMMARY OF THE INVENTION

Accordingly, it is a primary object of the present invention to provide an apparatus for effectively monitoring the hook status of a remotely stationed telephone irrespective of the configuration of the associated subscriber loop.

It is also an object of the present invention to provide an apparatus for effectively monitoring the hook status of a remotely stationed telephone, to regulate the operation of an alarm reporting device associated with the premises at which the telephone is stationed.

It is also an object of the present invention to provide an apparatus for effectively monitoring the hook status of a remotely stationed telephone, while also facilitating the detection of sub-audible tones associated with the corresponding alarm reporting device.

It is also an object of the present invention to provide an apparatus having the foregoing capabilities, yet which will not adversely affect the associated subscriber loop, or the equipment of the telephone company which is used in connection with that subscriber loop.

It is also an object of the present invention to provide an apparatus having the foregoing capabilities, yet which is effective irrespective of the characteristics of the subscriber loop with which it is used.

It is also an object of the present invention to provide an apparatus for effectively monitoring the hook status of a remotely stationed telephone, and a sub-audible tone associated with a corresponding alarm reporting device, which is not dependent upon DC voltages associated with the subscriber loop, and which is not limited by ground loop potential and ground-start related problems.

It is also an object of the present invention to provide an apparatus for effectively monitoring the hook status of a remotely stationed telephone, and a sub-audible tone associated with a corresponding alarm reporting device, which possesses the above described capabilities but which is inexpensive in construction and operation, and effective in use.

These and other objects are achieved in accordance with the present invention by providing an apparatus which monitors variations in impedance in the subscriber loop, as distinguished from variations in DC voltage or current. It has been found that while the DC voltage exhibited across the subscriber loop may not always vary to an effective extent in certain configurations, the loop impedance will change, and will change to an extent which is sufficient to enable an effective determination to be made regarding the hook status for the associated subscriber loop. Accordingly, it has been found that an effective remote determination of the hook status of a subscriber loop is made possible by monitoring the impedance across the subscriber loop at the central facility which is monitoring the remote location.

To this end, a disturbance (voltage signal) is introduced onto the subscriber loop by an appropriate source. Steps are then taken to measure potential variations in this voltage signal, and to determine the hook status of the subscriber loop based upon these variations in potential.

As with any equipment which is to be connected to a telephone subscriber loop, care must be taken to make sure that the ancillary equipment which is being connected to the system will not adversely affect basic telephone services. For this reason, care must be taken to make sure that the signal which is introduced in accordance with the present invention will neither create audible noises on the telephone line, nor interfere with the operation of the switching equipment of the telephone company. A low-frequency AC sine wave is preferably used for this purpose since such a signal is effectively passed despite the relatively low frequency response (range) of the telephone system, and yet is inaudible and therefore will not interfere with communications normally taking place in the audible range. It is has been found that a particularly advantageous signal for use in this regard is the low tone which is produced by the remotely stationed alarm reporting device, since this tone is not only sub-audible, but is also useful in providing the remote monitoring facility with a supervised indication of the status conditions at the remote location. The resulting signal is inductively coupled to the monitoring apparatus of the present invention to prevent unacceptable interference with the equipment of the telephone company, and to promote line balance and isolation.

For further detail regarding a preferred embodiment apparatus in accordance with the present invention, reference is made to the detailed description which is provided below, taken in conjunction with the following illustrations.

BRIEF DESCRIPTION OF THE DRAWINGS

FIG. 1 is a block diagram illustrating the basic elements of the apparatus of the present invention.

FIG. 2, is a schematic diagram showing the interface associated with this apparatus.

In the several views provided, like reference numerals denote similar structure.

DETAILED DESCRIPTION OF PREFERRED EMBODIMENTS

Figure 4:
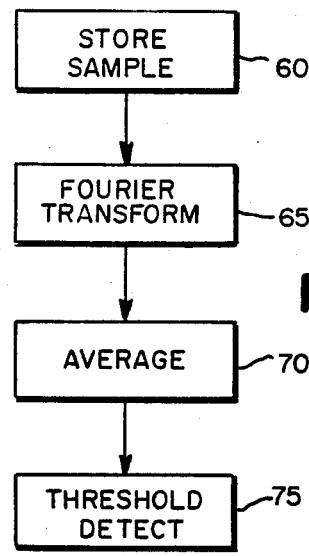
FIG. 4 is a block diagram showing an overview of the steps taken within the processor associated with this apparatus.

FIG. 1 generally illustrates a system 1 for monitoring a subscriber loop 2 in accordance with the present invention. The system 1 is connected across the ring 3 and tip 4 terminals of the subscriber loop, to interface with the subscriber loop 2 as will be described more fully below. The subscriber loop 2 communicates with a telephone 5 stationed at a remote location 6, in the conventional fashion. An alarm reporting unit 7 is also associated with the telephone 5, and the subscriber loop 2, to report status conditions at the remote location 6 making use of the subscriber loop 2.

A interface circuit 10 is provided to effectively interconnect the subscriber loop 2 with both the remainder of the system 1 of the present invention and a polling unit 11 for interacting with the alarm reporting unit 7 as disclosed in U.S. Pat. Nos. 4,442,320; 4,527,235; and 4,528,423, which are incorporated by reference as if fully set forth herein. To this end, periodic interrogations are initiated at 12, passing through the interface circuit 10 and the subscriber loop 2, for transmission to the remotely located alarm reporting unit 7. The data resulting from such interrogations is returned to the polling unit 11, via the subscriber loop 2 and the interface circuit 10, where it is received by the polling unit 11, at 13. These polling procedures continue during on-hook conditions, reporting conditions and identifying any alarm events which may be detected at the remote location 6.

However, since the signals associated with these polling procedures lie in the audible frequency range, such signals become objectionable when the telephone 5 is in use. For this reason, whenever the telephone 5 is drawn off-hook, presumably because it is in use, the above-described interrogations are discontinued to avoid unacceptable interference with normal use of the telephone 5. During these periods, a sub-audible (low) tone which is produced by the alarm reporting unit 7 is monitored to detect alarm conditions which may arise while the telephone 5 is in use. As long as the low tone remains present, further interrogations are inhibited. However, if the low tone is discontinued, an immediate interrogation is made to determine the reason for the event, irrespective of the hook status of the telephone 5.

It is therefore important to accurately determine the hook status of the telephone 5, as well as the presence or absence of low tone. To this end, the interface circuit 10 additionally communicates with a filter 15, which operates to isolate signals received from the subscriber loop to determine hook status and low tone content as will be described more fully below. These signals are periodically detected by sample and hold circuit 20. The sampled signals are then provided to an analog-to-digital converter 25, for introduction to a digital processor 30. A determination is made within the processor 30, based upon the signals received from the subscriber loop 2, whether the telephone 5 associated with the subscriber loop 2 is on-hook or off-hook, as well as whether low tone is being provided by the remotely stationed alarm reporting unit 7. Details regarding these elements of the system, and their manner of operation, will be described more fully below.

As with any ancillary equipment which is to be connected to the subscriber loop 2, care must be taken to make sure that the resulting connection does not adversely affect conventional telephone service. As earlier discussed, the system 1 of the present invention operates to monitor a signal which is impressed upon the subscriber loop 2 in order to make its determination regarding hook status. The selection of the signal which is used for this purpose is important since the selected signal must be appropriate to provide the information which is desired without interfering with normal telephone usage. For example, it is important to select a signal which is inaudible. This eliminates the use of DC signals due to the clicking which such signals tend to produce. The use of high frequency signals (above the audible range) is effectively prevented due to the limited frequency response associated with the subscriber loop 2. This leads to the selection of a low frequency AC signal which lies below the audible range. Care must also be taken to select a signal which is different from the operating frequencies used by the telephone company, such as the ring frequency (which is used to cause the telephone to ring), as well as the power line frequency. A variety of frequency selections can be made which will meet these requirements. However, it has been found that the low tone which the alarm reporting unit 7 described in the above identified U.S. Patents (e.g., the "Subscriber Terminal Unit" distributed by Base 10 Telecom, Inc., Trenton, N.J.) already uses as part of its operating characteristics (36.1 Hz in the United States; 25 Hz in Europe) is advantageously used in accordance with the present invention to make the determinations which are necessary. In addition to already accommodating the requirements of the telephone network, this signal also has the advantage that it is a calibrated signal of known source impedance, providing a useful signal for monitoring purposes.

The interface circuit 10 must therefore be capable of receiving a low frequency signal, without interfering with operation of the subscriber loop 2. To provide the bi-directional, low-impedance, broadband signal path which is required to properly pass the signals being produced, the interface circuit 10 must present a low series impedance to signals as low as 25 Hz. However, this leads to a corresponding loss in ringer equivalence (limiting the equipment which can be associated with the subscriber loop 2), as well as lowering the input impedance of the interconnection with the subscriber loop 2. The interface circuit 10 must therefore be configured to achieve an appropriate balance between the characteristics which are necessary to effectively couple the system 1 with the subscriber loop 2, as well as the characteristics which are necessary to isolate the system 1 from the subscriber loop 2. This is accomplished using a transformer-based interface circuit 10, as illustrated in FIG. 2 of the drawings.

To this end, the primary winding 31 of the transformer 32 is connected across the ring 3 and tip 4 terminals of the subscriber loop 2, for AC coupling purposes. A capacitor 33 is provided for DC blocking purposes. Series resistors 34, 35 are provided to limit the current into a transient suppressor 36, which is placed across the input of the interface circuit 10 to protect against transients resulting from lightning strikes or other transient occurrences.

In order to effectively respond to the low frequency signals which are expected from the subscriber loop 2, the series LC circuit formed by the capacitor 33 and the primary winding 31 of the transformer 32 will necessarily present a low impedance across the ring 3 and tip 4 terminals of the subscriber loop 2. While this is desired to effectively pass the low tone from the subscriber loop 2 to the remainder of the system 1, this also tends to present a low impedance at the ringing frequency, as well as developing a potential for series resonance. Although the marginal current limiting effect of the series resistors 34, 35 will to some extent tend to ameliorate these problems, the resulting circuit still tends to unacceptably compromise the ringer equivalence of the subscriber loop 2. It is therefore important to take steps to maintain a low resistance across the ring 3 and tip 4 terminals at low current levels, to effectively pass desired signals, but to present a high resistance across the ring 3 and tip 4 terminals at higher current level, such as are prevalent during a telephone ringing operation. To accomplish this, a current limiting circuit 40 is placed in series with the primary winding 31 of the transformer 32. A variety of different current limiting devices or circuits may be used for this purpose. However, to maintain a bi-directional character, it is preferable to provide a current limiting circuit 40 which does not place any semi-conducting (P-N) junctions in series with the resulting circuit. A device which exhibits such characteristics is available from Base 10 Telecom Inc., under the Part Number 70316.

As a result, the interface circuit 10 will not adversely affect the DC line voltages associated with the telephone network, nor will it compromise the network's operating frequencies. The desired balance and coupling is provided, while maintaining effective isolation characteristics sufficient to protect the integrity of the subscriber loop 2, and the equipment of the telephone company.

The transformer 32 then operates to couple signals received from the subscriber loop 2 to its secondary winding 37. These signals are made available at the output 41, which communicates with the filter 15 shown in FIG. 1 of the drawings. Suppressors 42, 43 are provided for protection against transients.

As previously indicated, the interface circuit 10 also operates to accommodate interrogations accomplished by the polling unit 1, via the subscriber loop 2. These signals are received from an amplifier 45 which is capacitively coupled (capacitor 46) to the secondary winding 37 of the transformer 32, for eventual transmission to the alarm reporting unit 7 via the subscriber loop 2. Again, suppressors 47, 48 are provided to protect against transients. This permits the signals which are used by the polling unit 11 (at 12) to perform its interrogations to be delivered to the subscriber loop 2, at 49, for processing in the usual manner. Responding signals are returned via the interface circuit 10, at 41, for return to the polling unit 11 (at 13). To be noted is that this also permits alternative signals to be introduced onto the subscriber loop 2, at 50. Such alternative signals may be used to inject a signal onto the subscriber loop 2, if desired. It is even possible to impress a signal onto the subscriber loop 2 which substitutes for the low tone which is ordinarily received from the remotely stationed alarm reporting unit 7, to provide an injected signal which is capable of being monitored in accordance with the present invention to establish the hook status of the remotely stationed telephone 5 even in circumstances when the low tone is not being received (either because it is unavailable or because the subscriber loop cannot pass it).

Accordingly, the interface circuit 10 operates to transmit signals to and receive signals from the subscriber loop 2, to effectively interface the polling unit 11 with the remotely stationed alarm reporting unit 7. What is more, the interface circuit 10 additionally operates to receive a signal, in this case low tone, from the remotely stationed alarm reporting unit 7 which, in accordance with the present invention, will vary in accordance with the hook status of the subscriber loop 2. These fluctuations are monitored and interpreted as follows.

Figure 3:
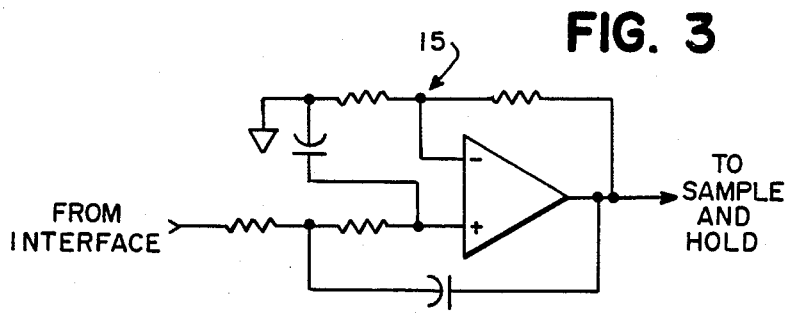
FIG. 3 is a schematic diagram showing the filter associated with this apparatus.

Signals received from the subscriber loop 2 are introduced to the filter 15, which primarily serves to pass the operative AC signal while reducing line noise as well as filtering other periodic disturbances such as dial tone, power-line noise, ringing, howling, speech, and the FSK signals associated with the above-described polling sequence. A circuit which can be used for this purpose is illustrated in FIG. 3 of the drawings.

The filtered signal is then delivered to the sample and hold circuit 20, which operates to periodically sample the signal and detect its amplitude as will be described more fully below. The sampled analog signal is then converted to a digital signal by the analog-to-digital converter 25. The digital signal is then delivered to the processor 30, for digital processing as follows.

FIG. 4 illustrates the procedure which is implemented by the processor 30 to monitor the subscriber loop 2 for the introduced signal (low tone), and to determine whether the monitored signal (amplitude) indicates that the telephone is on-hook or off-hook. This will also operate to determine the presence or absence of the low tone itself. To this end, the low tone is periodically sampled, and stored at 60. The periodicity of these samplings may be varied, and will depend upon the signals which are being monitored and the degree of accuracy which is believed necessary. In practice, it has been found that it is sufficient to sample the signal (waveform) every two milliseconds. Such samplings preferably proceed for one-half second to develop an ongoing indication of the status of the subscriber loop 2. This not only provides sufficient samplings for subsequent processing, but also allows for verification that a discontinued low tone is intended, and not just a temporary phenomenon. The samplings are in turn subjected to a Fourier Transform analysis, at 65, to determine the energy represented by the sampled waveform at its exhibited frequency. The analyzed waveform is then averaged at 70. A windowed average is preferably used to reduce anomalies. The resulting average value is then subjected to a threshold determination, at 75. If the resulting average lies below a minimum threshold, it is determined that there is no low tone and that an alarm condition exists at the remote location 6. The processor 30 then operates to cause the polling unit 11 to immediately interrogate the alarm reporting unit 7 at the remote location 6 to determine the nature of the alarm condition. If the resulting average exceeds this minimum threshold but lies below a specified secondary threshold, it is determined that the low tone is present and the telephone 5 is off-hook. The processor 30 then operates to inhibit the polling unit 11, since periodic interrogations are not to take place in such circumstances. If the resulting average exceeds the secondary threshold, it is determined that the low tone is present and the telephone 5 is on-hook. The processor 30 then operates to enable the polling unit 11, so that periodic interrogations may take place while the telephone is not in use.

It will therefore be seen that the above-described system 1 operates to effectively determine the hook status of a telephone stationed at a remote location, from a central monitoring facility, as well as to determine the presence or absence of low tone from the remotely stationed alarm reporting unit. This is accomplished without having to monitor DC voltages across the subscriber loop, or currents within the loop, enabling an effective determination to be made with a high degree of reliability and with a minimal impact upon the telephone system itself.

Figure 5:
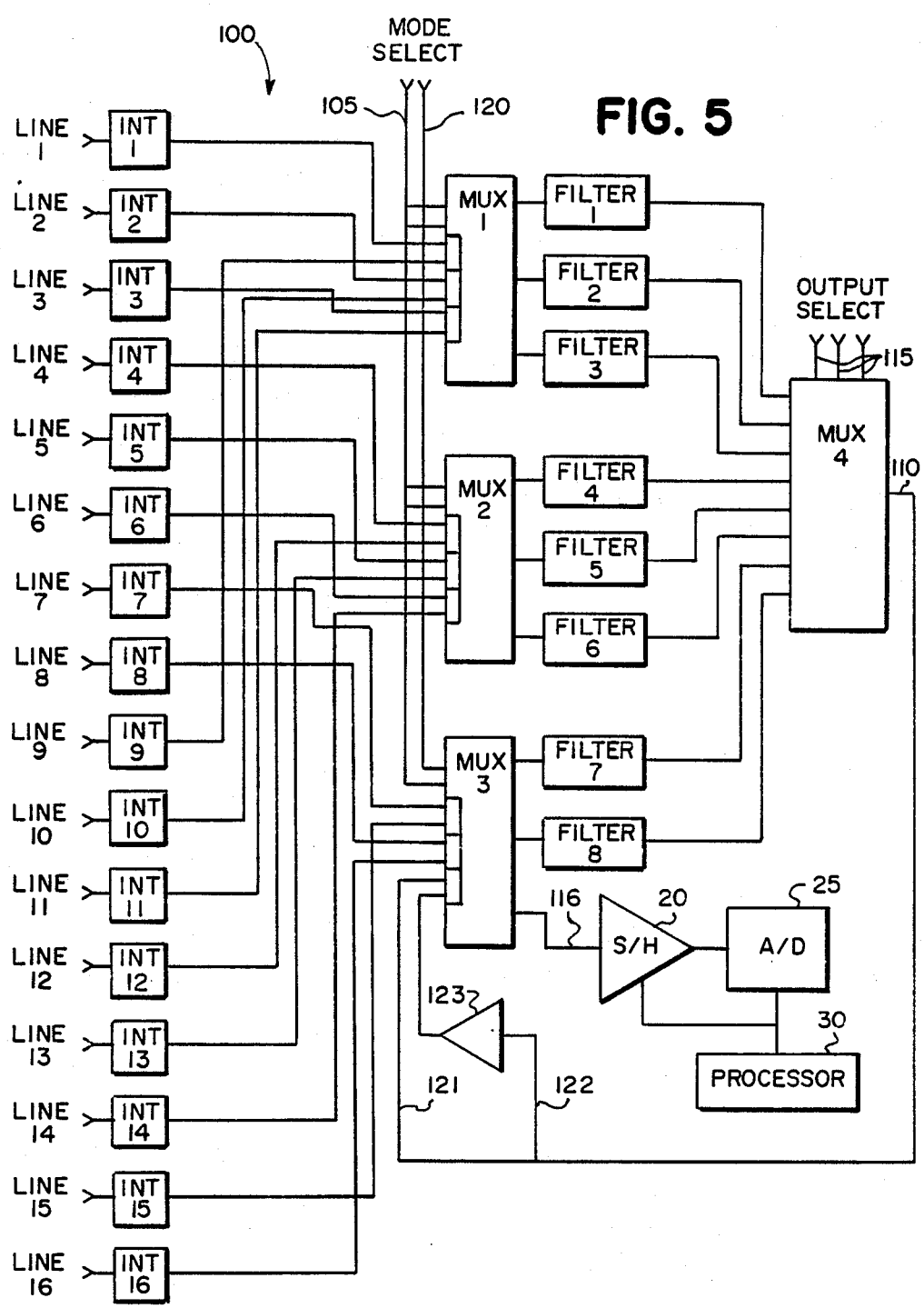
FIG. 5 is a schematic diagram showing a more comprehensive apparatus which is capable of monitoring plural remote facilities.

The system 1 which is shown in FIGS. 1–4 is useful in monitoring a single subscriber loop. However, practical applications will require the monitoring of plural subscriber loops in view of the significant number of installations which can be anticipated. FIG. 5 illustrates an alternative embodiment system 100 for simultaneously monitoring each of sixteen separate lines in accordance with the present invention.

The system 100 includes a series of sixteen interface circuits INT 1, INT 2 ... INT 16 which are connectable to each of sixteen available lines (subscriber loops). Each of these connections are established across the ring and tip terminals of the Lines 1–16, as previously described. Each of the interface circuits INT 1, INT 2 . . . INT 16 corresponds in structure to the interface circuit 10 which is illustrated in FIG. 2 of the drawings.

The outputs of the interface circuits INT 1, INT 2 . . . INT 16 are respectively coupled to selected inputs of each of three multiplexing circuits MUX 1, MUX 2 and MUX 3. Output signals are in turn passed from the multiplexing circuits MUX 1, MUX 2, MUX 3 to a series of eight filters, each of which corresponds to the filter 15 shown in FIG. 3 of the drawings. The outputs of Filters 1–8 are in turn coupled to yet another multiplexing circuit MUX 4.

As illustrated in the drawings, the inputs of the multiplexing circuits MUX 1, MUX 2, MUX 3 are paired to select between either of two communicating interface circuits. This selection is made by mode select signal 105, which operates to alternate between the paired inputs of the multiplexing circuits MUX 1, MUX 2, MUX 3, and accordingly, between the two interface circuits which are associated with each of these paired inputs. Each selected input is then filtered and applied to the multiplexing circuit MUX 4, which operates to serially review the outputs of Filters 1–8, for output at 110, responsive to the output select signal 115.

Figure 6:
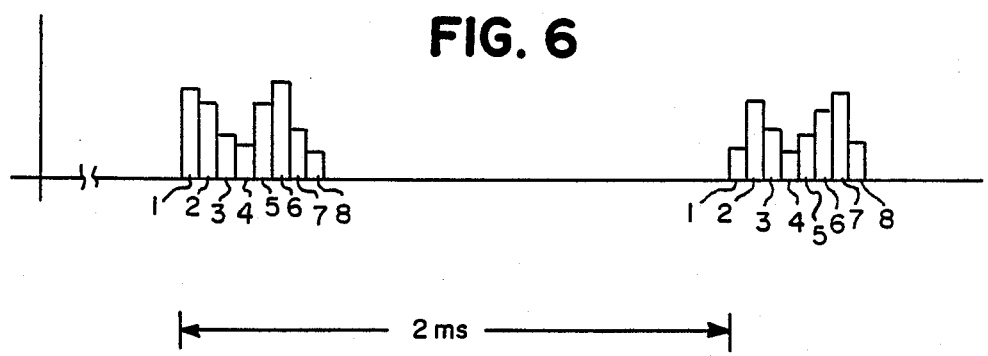
FIG. 6 is a graph illustrating characteristic signals associated with the apparatus of FIG. 5.

As previously indicated, the preferred sampling rate in accordance with the present invention is a two millisecond sampling rate which proceeds for one-half second. However, it has been found that the filtration which is necessary to effectively isolate the desired signal from the subscriber loop 2, if kept to a minimum cost, necessitates a significant amount of time to settle before subsequent signals can be applied. The mode select signal 105 and the output select signal 115 are therefore controlled to effectively receive data from each of the sixteen lines associated with the system 100, while simultaneously satisfying the needs of Filters 1-8. FIG. 6 illustrates the manner in which this is accomplished.

Referring to FIG. 6, it is seen that a basic sampling rate of two milliseconds is established, as previously described. To this end, the signals from Lines 1-8 are detected and respectively applied to the indicated inputs of multiplexing circuits MUX 1, MUX 2, MUX 3. Upon filtration, these signals are serially delivered from the multiplexing circuit MUX 4, at 110, in accordance with the output select signal 115. This produces a series of eight parameter values corresponding to the signals present on the Lines 1-8, for subsequent processing. It will be noted that the eight signals are assembled in a period of time which is significantly less than the available two milliseconds. The remaining time is primarily used to allow necessary processing tasks to be performed, and to a lesser extent to allow the Filters 1-8 to settle as previously described. Steps are then taken to again monitor the signals on Lines 1-8, during a second available two millisecond sampling period, and so on. These samplings proceed every two milliseconds for the total sampling period of one-half second, to collect a series of samplings for further processing.

Following this one-half second data-gathering period, steps are taken to process the assembled data as previously described for each of the eight lines which have been addressed. A one second period is provided for this and other procedures which are to take place within the processor 30. Thereafter, this same process is repeated for the Lines 9-16 during a second one and one-half second period, which proceeds as previously described to review conditions on the Lines 9-16. The mode select signal 105 is used to alternate between Lines 1-8 and Lines 9-16 to develop the previously described sampling sequence.

The actual data samplings are accomplished by the sample and hold circuit 20, which receives its input 116 from the output 110 of the multiplexing circuit MUX 4. Following conversion to digital form by the analog-to-digital converter 25, the received samplings are individually analysed as previously described, within the processor 30. The processor 30 therefore operates to not only advise the polling unit 11 of the status of the system, but also to regulate the mode select signal 105 and the output select signal 115 to provide desired data to the processor 30 as previously described.

It will be noted that the data to be sampled (which is delivered from the multiplexing circuit MUX 4, at 110) is received from the multiplexing circuit MUX 3. The reason for this is that depending upon the condition of each of the Lines 1-16, it is possible that the signal which is received from the output 110 will be insufficient for further processing. In such case, amplification is required before further processing can continue, to effectively extend the dynamic range of the subsequent processing circuit. For this reason, the processor 30 preferably makes an initial determination as to whether or not the output 110 is sufficient for further processing. This determination is used as a mode select signal 120, which in turn regulates operation of the multiplexing circuit MUX 3 to select between a first signal path 121 which passes an unamplified signal to the processor 30, and a second signal path 122 which delivers an amplified (amplifier 123) signal to the processor 30. This allows the processor 30 to select the signal which is needed for further processing.

The processor 30 contains appropriate software for both developing signals, and processing resulting signals, as previously described. An exemplary program listing for accomplishing these tasks is appended to this specification. This program listing is effectively implemented in a circuit which includes the following components.

| Component | Identifying Number |
|---|---|
| Processor 30 | HD63B09P (Hitachi) |
| -EPROM | TC57256D-25 (Toshiba) |
| -RAM | TC55257P-12 (Toshiba) |
| -Programmable Timer | HD63B40P (Hitachi) |
| -EPLD (Programmed) | EP320PC (Altera) |

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. An apparatus for determining hook status conditions of a telephone connected to an associated telephone subscriber loop, comprising:
   means for introducing a voltage signal onto said subscriber loop;
   means for measuring the amplitude of said voltage signal, connected across said subscriber loop; and
   means for detecting the level of said amplitude, and for determining said hook status conditions according to said level.

2. The apparatus of claim 1 wherein said voltage signal is inaudible and does not interfere with said subscriber loop.

3. The apparatus of claim 2 wherein said voltage signal is a sub-audible AC sine wave.

4. The apparatus of claim 1 wherein said measuring means is inductively coupled with said subscriber loop.

5. The apparatus of claim 4 wherein a transformer couples said measuring means with said subscriber loop.

6. The apparatus of claim 5 wherein said coupling is DC blocking.

7. The apparatus of claim 6 wherein said coupling effectively passes low frequency AC signals.

8. The apparatus of claim 7 wherein said coupling exhibits a low input impedance for operative currents.

9. The apparatus of claim 8 wherein said coupling exhibits a higher input impedance for increased currents.

10. The apparatus of claim 9 wherein said coupling includes current limiting means in series connection therewith.

11. The apparatus of claim 4 wherein said coupling is bi-directional.

12. The apparatus of claim 11 wherein said coupling passes voltage signals received from said subscriber loop, and control signals applied to said subscriber loop.

13. The apparatus of claim 1 wherein said detecting means comprises:

filter means for isolating said voltage signal, coupled to said measuring means; and sampling means for detecting the amplitude of said isolated voltage signal, coupled to said filter means.

14. The apparatus of claim 13 wherein said detecting means is digital, and further comprises:

analog-to-digital conversion means for converting an analog amplitude of said sampled voltage signal to a digital signal, coupled to said sampling means; and processor means for receiving said digital signal and for determining said hook status conditions according to said digital signal, coupled to said analog-to-digital conversion means.

15. The apparatus of claim 14 wherein said processor means comprises:

means for storing sampled voltage signals received from said analog-to-digital conversion means;

means for performing a Fourier Transform analysis of said stored, sampled voltage signals;

means for averaging said analyzed voltage signals; and means for measuring the level of said averaged signals and for determining said hook status conditions according to said measured level.

16. The apparatus of claim 15 wherein said voltage signals are sampled every 2 milliseconds.

17. The apparatus of claim 16 wherein said voltage signals are sampled for a period of ½ second.

18. The apparatus of claim 15 wherein said average is a windowed average.

19. The apparatus of claim 15 wherein said determining means identifies an on-hook status condition when said measured level lies above a selected threshold and an off-hook status condition when said measured level lies below said selected threshold.

20. The apparatus of claim 19 wherein an alarm reporting device is coupled with said telephone to report alarm conditions using said subscriber loop, wherein said alarm reporting device includes a sub-audible tone as one of its operating frequencies, and wherein said sub-audible tone provides said voltage signal on the subscriber loop.

21. The apparatus of claim 20 wherein said sub-audible tone has a frequency of from 25-37 Hz.

22. The apparatus of claim 20 wherein said sub-audible tone is calibrated signal of known source impedance.

23. The apparatus of claim 20 wherein said determining means further identifies a presence or absence of said sub-audible tone on said subscriber loop.

24. The apparatus of claim 23 wherein said determining means identifies the presence of said sub-audible tone when said measured level lies above a defined threshold less than the selected threshold which is used to determine said hook status conditions, and the absence of said sub-audible tone when said measured level lies below said defined threshold.

25. The apparatus of claim 1 wherein an alarm reporting device is coupled with said telephone to report alarm conditions using said subscriber loop, wherein said alarm reporting device includes a sub-audible tone as one of its operating frequencies, and wherein said sub-audible tone provides said voltage signal on the subscriber loop.

26. The apparatus of claim 25 wherein a device for polling said alarm reporting device is inductively coupled with said subscriber loop.

27. The apparatus of claim 26 wherein said polling device provides interrogation signals to said alarm reporting device, and receives polled responses from said alarm reporting device, using said subscriber loop.

28. The apparatus of claim 27 wherein said interrogation signals are provided according to the hook status conditions of said telephone.

29. The apparatus of claim 28 wherein said polling device is controlled by said hook status determining apparatus so that said interrogations are provided when said telephone is on-hook and are inhibited when said telephone is off-hook.

30. The apparatus of claim 29 wherein said polling device is caused to provide said interrogation signals when said sub-audible tone is discontinued, irrespective of said hook status conditions.

31. An apparatus for determining hook status conditions of a plurality of telephones connected to each of a plurality of telephone subscriber loops, comprising:

means for introducing a voltage signal onto each of said subscriber loops;

means for separately measuring the amplitude of the voltage signal on each of said subscriber loops, connected across said subscriber loops; and means for detecting the level of the amplitude measured on each of said subscriber loops, and for determining the hook status conditions associated with each of said subscriber loops according to said measured levels.

32. The apparatus of claim 31 wherein said detecting means comprises:

filter means for isolating said voltage signals from other signals occurring on said subscriber loops;

sampling means for detecting the amplitude of each of said isolated voltage signals;

analog-to-digital conversion means for converting an analog amplitude of each of said sampled voltage signals to a digital signal, coupled to said sampling means; and processor means for receiving each of said digital signals and for determining the hook status conditions on each of said subscriber loops according to each of said digital signals, coupled to said analog-to-digital conversion means.

33. The apparatus of claim 32 wherein said measuring means and said filter means are coupled by multiplexing means for coupling selected filters with selected subscriber loops.

34. The apparatus of claim 33 wherein said multiplexing means operate to couple said filters with a first group of subscriber loops during a first sampling period, and a second group of subscriber loops different from said first group during a second sampling period.

35. The apparatus of claim 34 wherein said first sampling period and said second sampling period are 1.5 seconds in duration.

36. The apparatus of claim 34 wherein said first group of subscriber loops are repeatedly sampled in said first sampling period and said second group of subscriber loops are repeatedly sampled in said second sampling period.

37. The apparatus of claim 36 wherein each subscriber loop in the group of subscriber loops being sampled is sampled within a period of time which is less than the period of time between said repeated samplings, thereby providing time for said filter means to settle prior to a subsequent sampling.

38. The apparatus of claim 36 wherein said samplings are repeated at 2 millisecond intervals.

39. The apparatus of claim 38 wherein said samplings are repeated for a period of ½ second.

40. The apparatus of claim 34 wherein said multiplexing means are regulated by said processor means.

41. The apparatus of claim 32 wherein said filter means are coupled to multiplexing means for serially coupling said filter means with said sampling means.

42. The apparatus of claim 41 wherein said multiplexing means for serially coupling said filter means with said sampling means are regulated by said processor means.

43. The apparatus of claim 32 wherein said filter means and said sampling means are separated by means for selecting the input for said sampling means between an amplified signal from said filter means, and an unamplified signal from said filter means.

44. The apparatus of claim 43 wherein said selecting means are regulated by said processor means.

* * * * *